United States Patent
Shiozawa et al.

(10) Patent No.: US 7,940,616 B2
(45) Date of Patent: May 10, 2011

(54) OPTICAL DISK APPARATUS AND TILT CONTROL METHOD THEREOF

(75) Inventors: Akinori Shiozawa, Yokohama (JP); Kouji Minabe, Hitachiota (JP); Kazunori Uemura, Ebina (JP)

(73) Assignee: Hitachi, Ltd., Tokyo (JP)

( * ) Notice: Subject to any disclaimer, the term of this patent is extended or adjusted under 35 U.S.C. 154(b) by 192 days.

(21) Appl. No.: 12/430,141

(22) Filed: Apr. 27, 2009

(65) Prior Publication Data
US 2010/0002552 A1 Jan. 7, 2010

(30) Foreign Application Priority Data
Jul. 4, 2008 (JP) .................................. 2008-176177

(51) Int. Cl.
G11B 15/52 (2006.01)
(52) U.S. Cl. ................................... 369/47.36; 369/53.19
(58) Field of Classification Search .......................... None
See application file for complete search history.

(56) References Cited

U.S. PATENT DOCUMENTS
6,842,414 B1 * 1/2005 Park ........................... 369/53.19
7,164,639 B2 1/2007 Yamamoto et al.

FOREIGN PATENT DOCUMENTS
JP 2004-095044 3/2004

* cited by examiner

Primary Examiner — Paul Huber
(74) Attorney, Agent, or Firm — Antonelli, Terry, Stout & Kraus, LLP.

(57) ABSTRACT

An optical disk apparatus which can carry out tilt control using a signal of a focus control system so as to improve the recording/reproducing performance of an optical disk. The optical disk apparatus includes a motor which rotates the optical disk, an optical pickup which reads at least information from the optical disk being rotated by the motor, a first memory which uses information of a rotation angle of the optical disk from the optical pickup as an address, a second memory which stores an offset by which information stored in the first memory should be shifted and then read, and a control portion which reads the information stored in the first memory after shifting the information by the offset stored in the second memory and which carries out tilt control using the read information.

7 Claims, 8 Drawing Sheets

RANGE OF DISK ROTATION PERIOD

OPTICAL DISK APPARATUS AND TILT CONTROL METHOD THEREOF

BACKGROUND OF THE INVENTION

1. Field of the Invention

The present invention relates to an optical disk apparatus for reproducing information recorded on an optical disk or for recording information on an optical disk and reproducing the information recorded on the optical disk, and a tilt control method of the optical disk apparatus.

2. Description of the Related Art

Control, specifically called tilt control is carried out in an optical disk apparatus such as a video recorder, a video camera or a PC optical storage disk drive, so as to read information from or write information on an optical disk such as a CD (Compact Disc), a DVD (Digital Versatile Disc) or a BD (Blu-ray Disc). The tilt control is control for correcting coma aberration which occurs when the laser beam axis of an optical pickup is not kept perpendicular to the recording surface of the optical disk. By the tilt control, the optical disk apparatus can record and read information properly in spite of surface fluctuation of the optical disk which is rotating, a warp in the optical disk, or the like. Thus, the optical disk apparatus can perform recording/reproducing stably.

There is a known technique for tilt control (for example, JP-A-2004-95044) as follows. That is, a DC voltage value is obtained in each of an inner circumferential position and an outer circumferential position of the optical disk based on a driving signal to be supplied to a focusing coil built in the optical pickup. A relation between each position and the DC voltage value is obtained from the obtained DC voltage value. A signal obtained by adding a DC voltage value calculated from the obtained relation to an AC signal contained in the driving signal to be supplied to the focusing coil is supplied to a tilt adjustment coil so as to adjust the inclination of an objective lens.

A technique for adjusting inclination of an objective lens with respect to the surface fluctuation of an optical disk has been known as described previously. However, the technique cannot be applied to an optical disk apparatus directly. This has something to do with a difference in configuration between a focus control system and a tilt control system, in that the former is based on feed-back control using an error signal, while the latter is based on feed-forward control. A signal frequency band required in the tile control system is as wide as a disk rotation period or about twice as large as the disk rotation period in consideration of a warp of the disk or the like. In frequency, the band is several tens to several hundreds of Hz. Since the tilt control system is based on feed-forward control, a control command value corresponds to a control set value, and its gain is 0 dB. On the other hand, in the focus control system, an error with respect to a set value is suppressed sufficiently, and the gain reaches several tens of dB in the frequency corresponding to the disk rotation period. The signal band of the focus control system reaches about several kHz. Thus, when a signal in the focus control system is applied directly to the tilt control system so as to track the surface fluctuation of the optical disk, the signal is too rich in unnecessary high-frequency components to be practical in view of the signal quality for tilt control. Thus, there is a problem that servo deviation is caused by resonance of an actuator or the like.

If configuration is made in such manner that the signal is passed through a low pass filter to limit the high-frequency signal band of the focus control system which band will be unnecessary for tilt control, the signal quality can be improved. However, a phase delay occurs due to the insertion of the low pass filter. Thus, the signal has a certain amount of delay with respect to the surface fluctuation of the optical disk. When the signal quality is improved in this manner, the influence of a phase angle cannot be ignored. Thus, there is a problem that the tilt control cannot track the surface fluctuation of the optical disk accurately.

SUMMARY OF THE INVENTION

The present invention was developed in consideration of the aforementioned problems. An object of the present invention is to provide an optical disk apparatus and a tilt control method thereof, by which tilt control is carried out using a signal of a focus control system so as to improve the recording/reproducing performance of an optical disk.

The present invention provides an optical disk apparatus including a motor which rotates an optical disk; an optical pickup which reads at least information from the optical disk being rotated by the motor; a first memory which uses information of a rotation angle of the optical disk from the optical pickup as an address; a second memory which stores an offset by which focus driving signal information stored in the first memory should be shifted and then read; and a control portion which reads the focus driving signal information stored in the first memory after shifting the focus driving signal information by the offset stored in the second memory and which carries out tilt control using the read focus driving signal information.

According to the present invention, it is possible to provide an optical disk apparatus and a tilt control method thereof, by which tilt control is carried out using a signal of a focus control system so as to improve the recording/reproducing performance of an optical disk.

DETAILED DESCRIPTION OF THE INVENTION

Embodiments of the present invention will be described below with reference to the drawings.

First Embodiment

Figure 1:
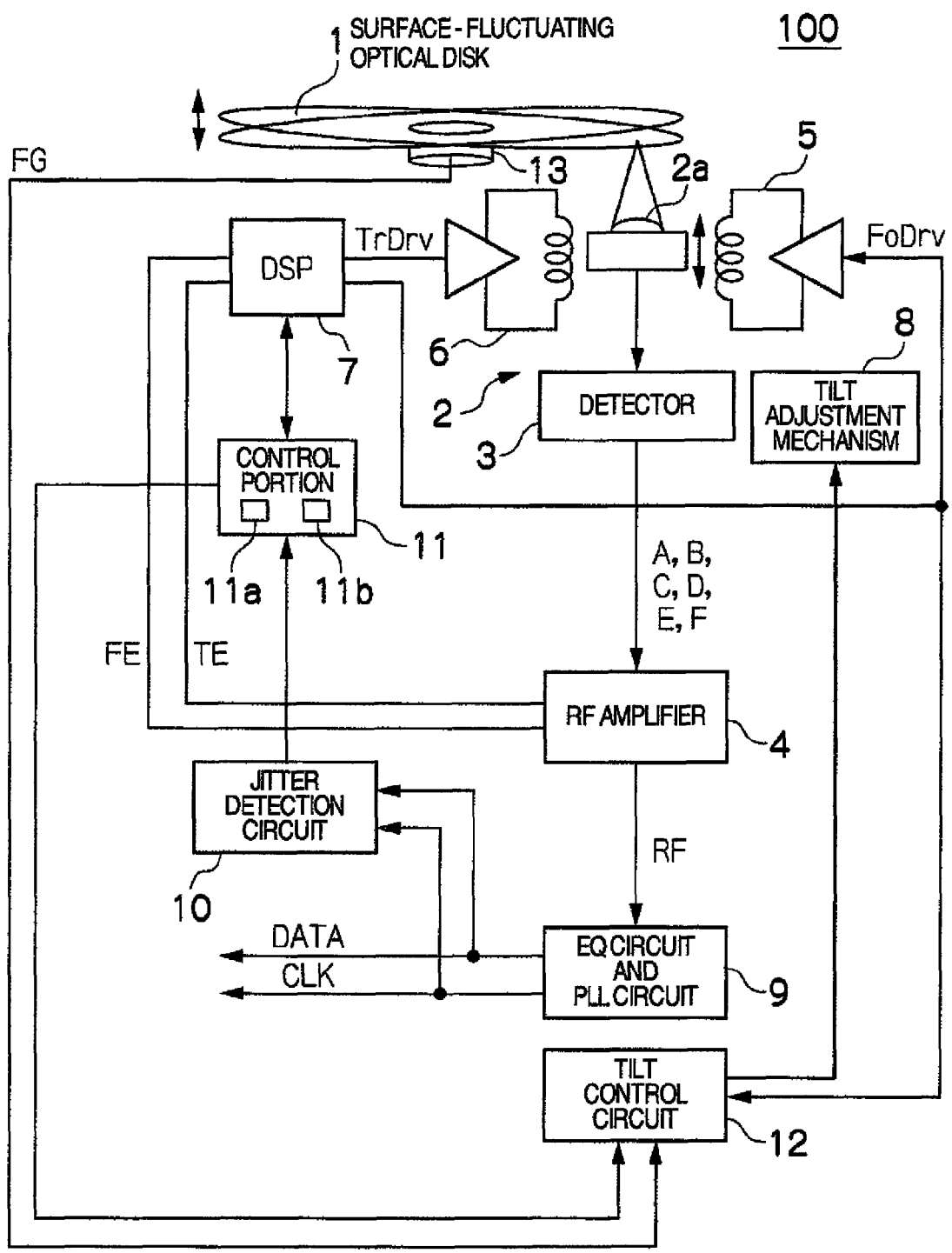
FIG. 1 is a diagram showing a configuration of an optical disk apparatus according to a first embodiment of the present invention.

FIG. 1 is a block diagram showing a configuration of an optical disk apparatus. As shown in FIG. 1, an optical disk apparatus 100 includes an optical disk 1, an optical pickup 2, a detector 3, an RF amplifier 4, a focus actuator 5, a tracking actuator 6, a servo processor 7, a tilt adjustment mechanism 8, an equalizer (EQ) circuit and PLL circuit 9, a jitter detection circuit 10, a control portion 11, a tilt control circuit 12 and a spindle motor 13.

The optical disk 1 is an optical disk such as a CD, a DVD, a BD or the like. The optical pickup 2 includes a pickup lens 2a. The optical pickup 2 emits laser light to the optical disk 1 through the pickup lens 2a and receives light reflected by the optical disk 1. The detector 3 converts the light reflected by the optical disk 1 and obtained by the optical pickup 2 into electric signals, and detects electric signals A, B, C and D which will be output signals for reading data from the optical disk 1 and detecting a focus error, and signals E and F which will be signals for detecting a tracking error.

The RF amplifier 4 generates a focus error signal which is a differential signal between a signal obtained by adding the signals A and C outputted from the detector 3 and a signal obtained by adding the signals B and D outputted from the detector 3. In addition, the RF amplifier 4 generates a tracking error signal which is a differential signal between the signals E and F outputted from the detector 3. Further, the RF amplifier 4 adds the signals A, B, C and D outputted from the detector 3, so as to generate an RF signal.

The focus actuator 5 drives the optical pickup 2 in a focusing direction. The tracking actuator 6 drives the optical pickup 2 in a tracking direction. The tracking error signal and the focus error signal are inputted from the RF amplifier 4 to the servo processor 7. Based on the focus error signal, the servo processor 7 controls the focus actuator 5 so as to always focus the laser light on a signal surface of the optical disk 1. At the same time, based on the tracking error signal, the servo processor 7 controls the tracking actuator 6 so as to make the laser light always track spiral or concentric tracks of the optical disk 1.

The tilt adjustment mechanism 8 corrects a tilt generated between the optical disk 1 and the optical pickup 2. The equalizer (EQ) circuit and PLL circuit 9 shapes the waveform of the RF signal and generate a binary signal DATA of the RF signal and a synchronous clock CLK. The jitter detection circuit 10 detects jitter from the binary signal DATA and the synchronous clock CLK. Based on a detection state of the jitter inputted to the control portion 11 from the jitter detection circuit 10, the control portion 11 controls the servo processor 7. In addition, the control portion 11 has the learning memory 11a which will be described later and the offset memory 11b which stores an offset. The tilt control circuit 12 controls driving of the tilt adjustment mechanism 8. The optical disk 1 is fitted to the spindle motor 13. The spindle motor 13 rotates the optical disk 1 fitted thereto.

Figure 2:
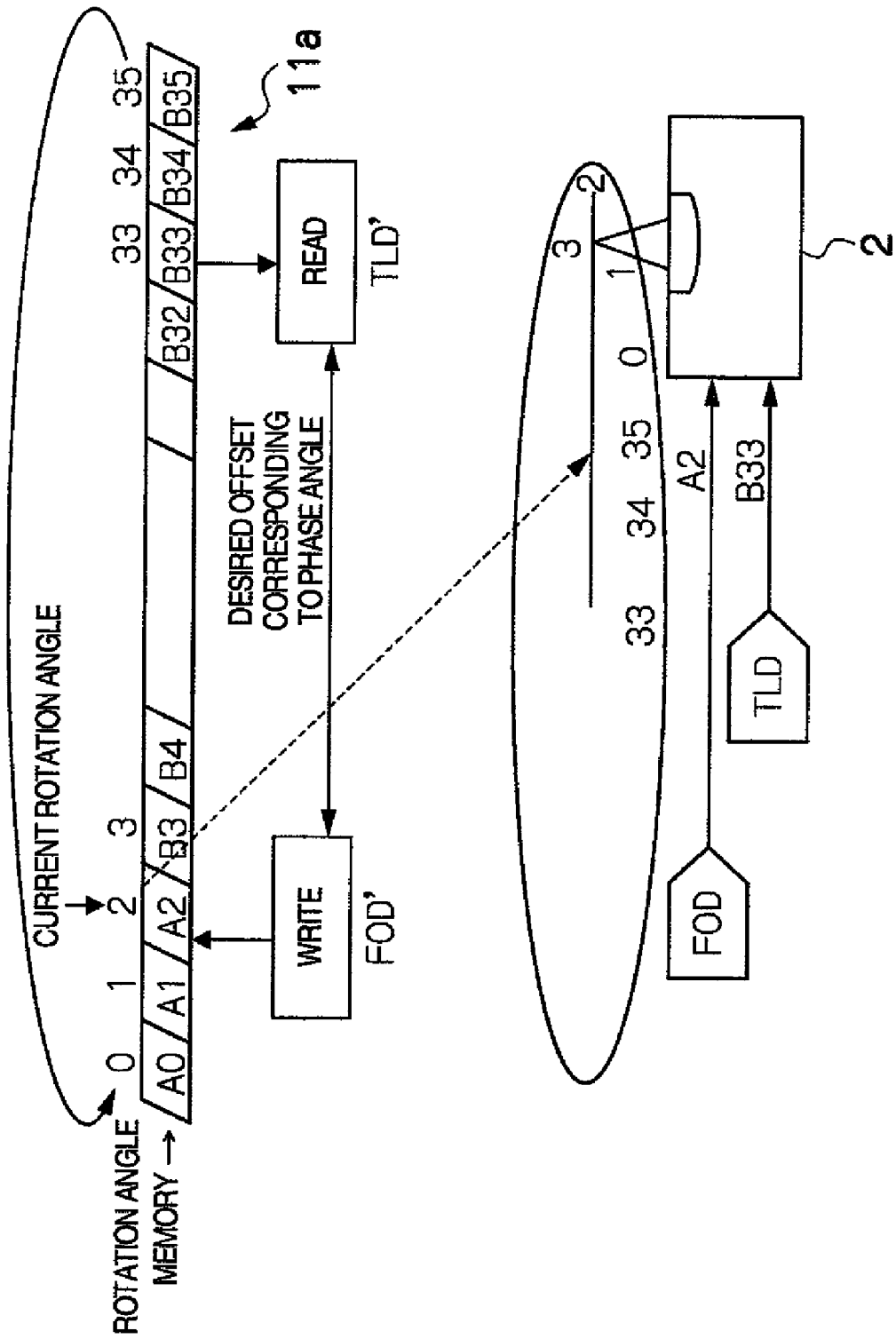
FIG. 2 is a diagram for explaining contents to be stored in a learning memory and an offset memory, and tilt control according to the first embodiment.

FIG. 2 is a diagram for explaining contents to be stored in the learning memory 11a and the offset memory 11b and the tilt control.

The learning memory 11a has N data storage areas where data can be stored in units of rotation angles obtained by dividing one round of the optical disk 1 into N. Here, description will be made in the case where the learning memory 11a has 36 data storage areas. The learning memory 11a is formed as a ring buffer in which once data have been stored in the areas No. 0 to No. 35, data are stored again in turn in numeric order from the area No. 0. The data to be stored in the areas of predetermined units in the rotation direction No. 0 to No. 35 are focus driving signals which can be obtained for every 10 degrees when the optical disk 1 is rotated by the spindle motor 13.

Since the learning memory 11a is a ring buffer, for example, data B0, B1, B2, B3, ..., B35 are stored in the areas No. 0 to No. 35, and data A0, A1 and A2 are then written over the data B0, B1 and B2 in the areas No. 0 to No. 2. FIG. 2 shows the case where the leaning memory 11a has been updated with the latest data A2 in the current rotation angle No. 2.

An offset corresponding to a phase angle which will be generated in a control system for the purpose of performing tilt control is set in the offset memory 11b in advance. The offset is an amount indicating the difference between an index (shown as the rotation angles No. 0 to No. 35 in FIG. 2) of a memory area where a focus driving signal (FOD') passed through an LPF (Low Pass Filter) should be written and an index of a memory area where data to be read from the learning memory 11a as a tilt driving signal (TLD) have been stored. For example, assume that an offset has been set as shown in FIG. 2. In this case, if the focus driving signal is the data A2, the tilt driving signal will be data B33. The offset is decided correspondingly to the rotational velocity of the optical disk 1 and in accordance with the configuration of the optical disk apparatus 100, the design of the LPF and so on, and set in the offset memory 11b.

Figure 3:
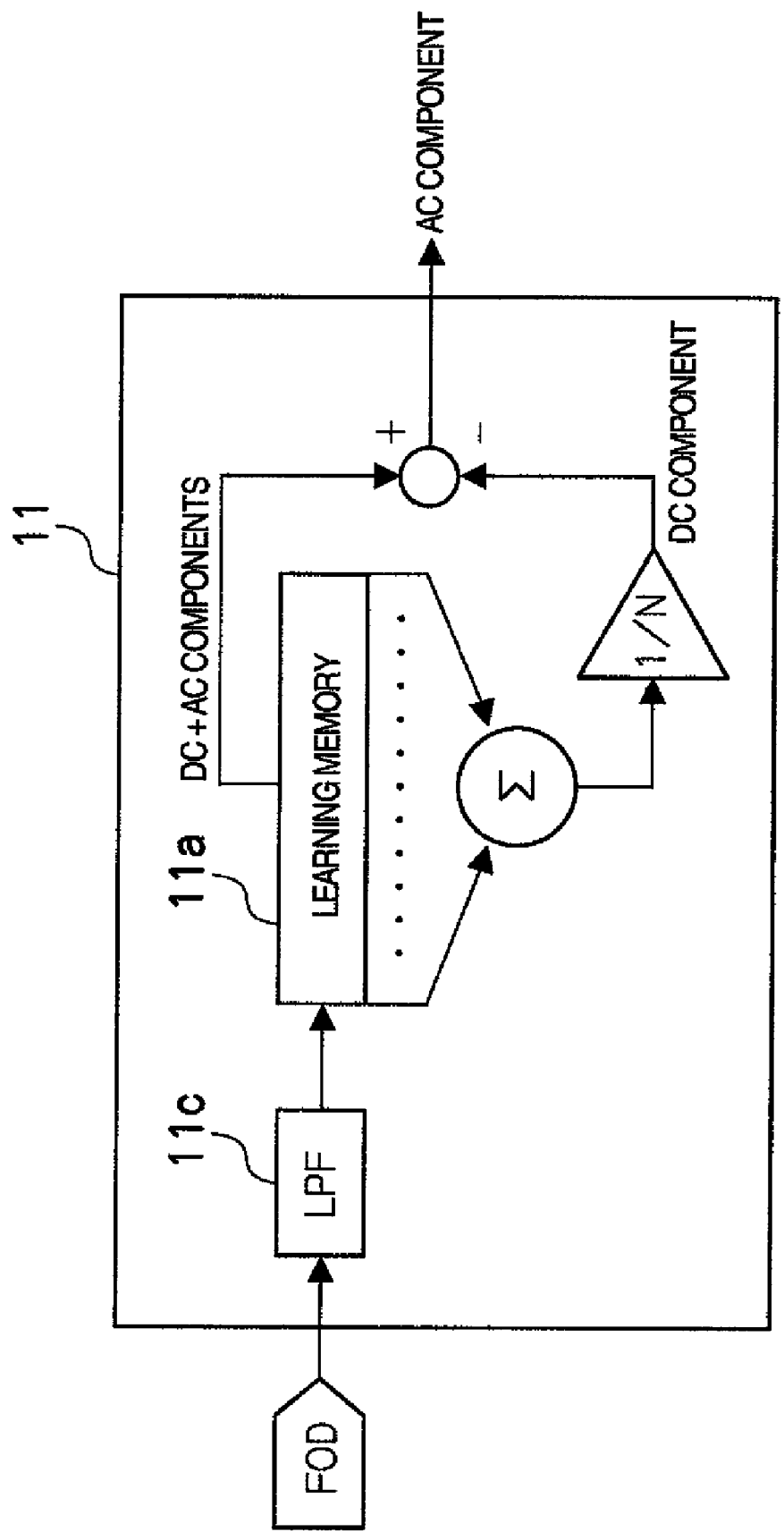
FIG. 3 is a diagram for explaining processing for carrying out the tilt control using a signal of a focus control system according to the first embodiment.
Figure 4:
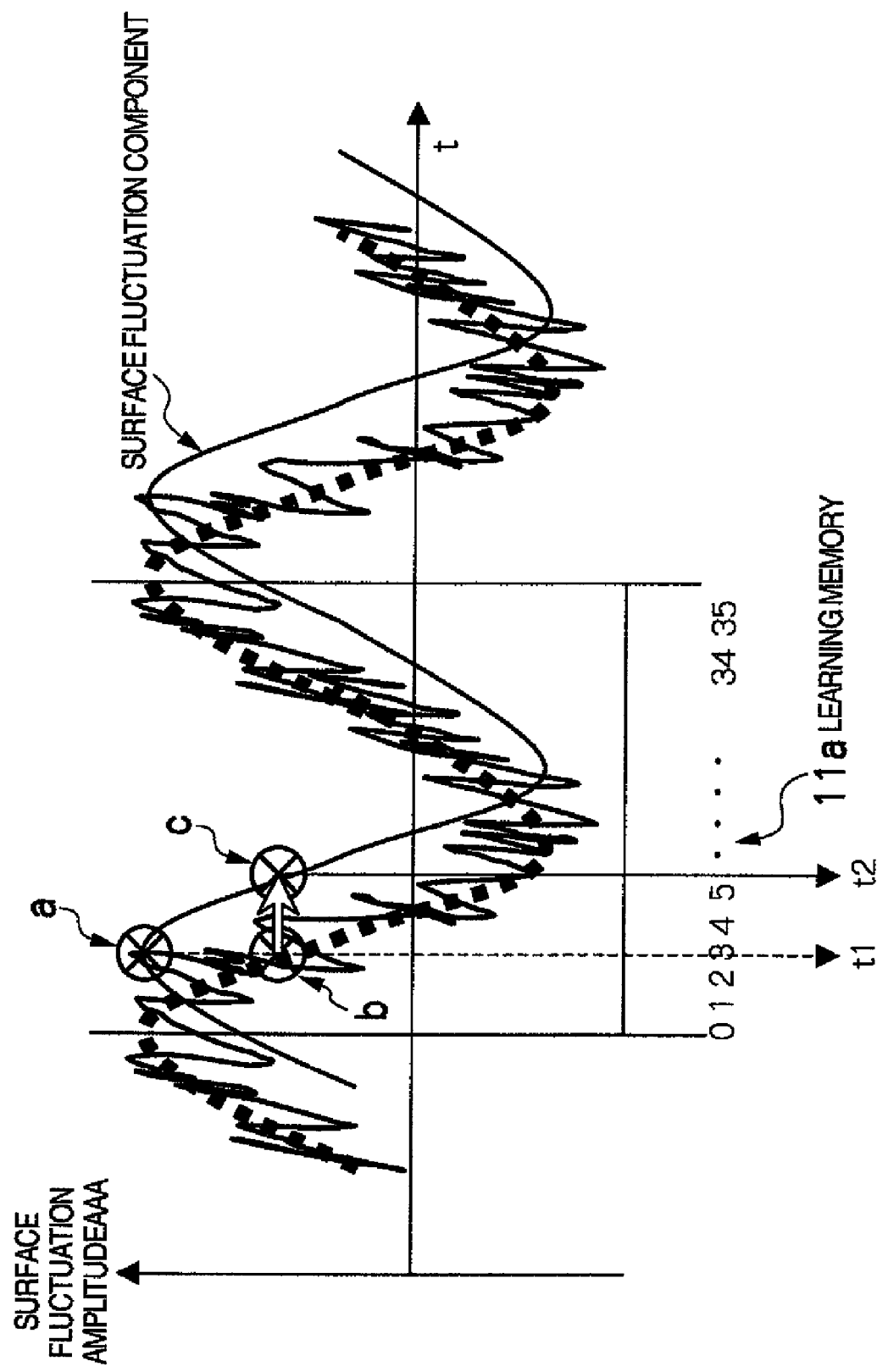
FIG. 4 is a diagram for explaining processing for carrying out the tilt control using the signal of the focus control system according to the first embodiment.

FIGS. 3 and 4 are diagrams for explaining processing for carrying out tilt control using the focus driving signal by use of the offset stored in the offset memory 11b. FIG. 3 is a diagram showing a part of the configuration of the control portion 11. FIG. 4 is a diagram showing the relationship between the amplitude of surface fluctuation and the time.

The control portion 11 includes the learning memory 11a and an LPF 11c. The signal band of the focus driving signal (FOD) is so wide that the focus driving signal will be a signal with a low S/N (Signal to Noise) ratio if the focus driving signal is used directly for tilt control. For this reason, the band of the focus driving signal is limited to a frequency band about twice as wide as one rotation period of the optical disk 1 by the LPF 11c. The band-limited signal is stored in the learning memory 11a. After that, all the pieces of data stored in the learning memory 11a are added and then averaged. The averaged component obtained thus is outputted as a DC (Direct Current) component. In addition, the component obtained by subtracting the averaged DC component from an output including the DC component and an AC (Alternating Current) component from the learning memory 11a is outputted as an AC component. According to this configuration, an AC-like tilt component caused by disk rotation including surface fluctuation or the like can be extracted.

As shown in FIG. 4, the amplitude of surface fluctuation written in the area No. 3 of the learning memory 11a for a time t1 is on a level a, while the real amplitude of surface fluctuation at the time t1 is on a level b. The amplitude of surface fluctuation to be referred to for generating a tilt driving signal at the time t1 is not on the level a but on the level b. It is therefore necessary to read a value for a time t2, that is, the value of the area No. 5 of the learning memory 11a. When such a fixed offset is added to the position from which a value should be read, it is possible to refer to and obtain a proper control value.

Next, matters related to tilt control using a focus driving signal will be described with reference to FIGS. 5 to 8.

Figure 5:
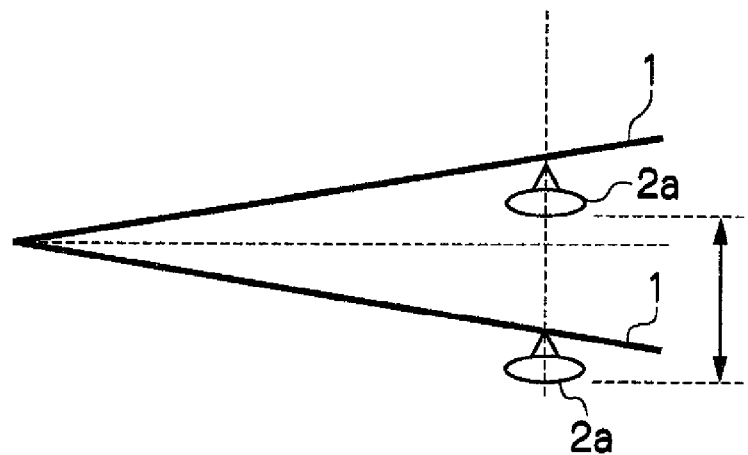
FIG. 5 is a diagram for explaining a relationship among an optical disk having surface fluctuation, the signal of the focus control system and the tilt control according to the first embodiment.
Figure 6:
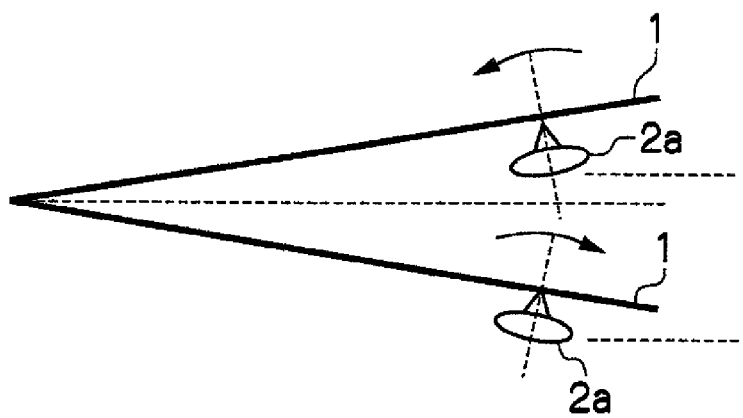
FIG. 6 is a diagram for explaining the relationship among the optical disk having surface fluctuation, the signal of the focus control system and the tilt control according to the first embodiment.

FIGS. 5 and 6 are diagrams for explaining the relationship among the optical disk 1 having a surface fluctuation, a signal of a focus control system, and tilt control. In FIG. 5, a surface fluctuation component of the optical disk 1 having a surface fluctuation appears in a focus driving signal because servo control tracks the up/down motion of the pickup lens 2a. Tilt correction can be carried out on the optical disk 1 by a swinging motion of the pickup lens 2a as shown in FIG. 6.

Figure 7:
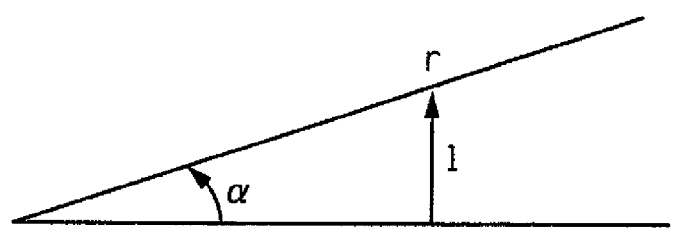
FIG. 7 is a diagram for explaining a principle for calculating a tilt angle from components of the signal of the focus control system according to the first embodiment.

FIG. 7 is a diagram for explaining the principle for calculating a tilt angle from components of the focus driving signal. If a radial position of the optical disk 1 and a height component in the radial position are "r" and "l" respectively when the optical disk 1 is inclined at an angle "α", the inclination "α" can be obtained by the following expression (1).

$$\alpha = \sin^{-1}(l/r) \quad (1)$$

As shown in the expression (1), it is understood that the tilt angle "α" differs from one radial position "r" of the optical disk 1 to another even when the height component "l" obtained from the focus components is fixed. That is, in principle, a correction coefficient needs to be set in accordance with the radial position when a tilt control signal is generated from the focus driving signal.

Figure 8:
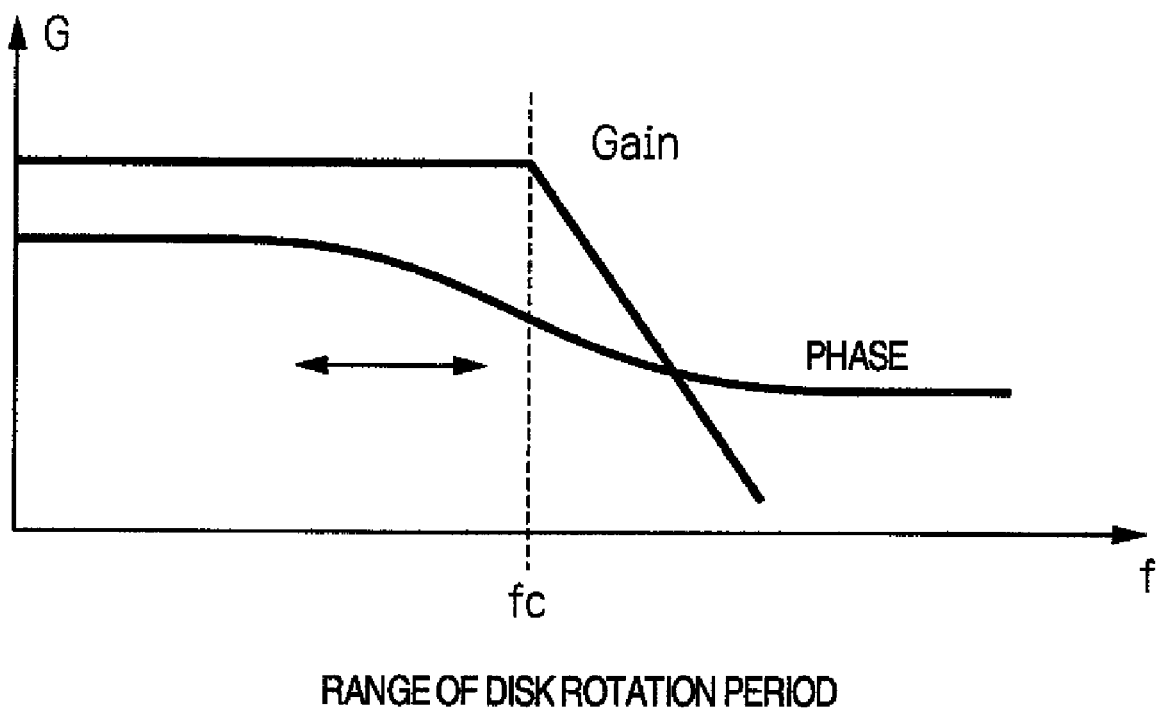
FIG. 8 is a diagram showing a relationship between the frequency characteristic of an LPF and a frequency range of a rotation period of the optical disk.

FIG. 8 is a diagram showing the relationship between the frequency characteristic of the LPF 11c and the frequency range of the rotation period of the optical disk 1. In FIG. 8, the abscissa designates the frequency, and the ordinate designates the gain and the phase. The range illustrated by the double-arrow line designates the range of one rotation period of the optical disk 1. In order to block high-frequency components of the focus driving signal and pass disk rotation period components thereof, it is desirable to set a cutoff frequency fc of the LPF 11c to allow components up to a frequency as high as or about twice as high as the upper limit of the disk rotation period. On this occasion, a phase delay which is considerable in the tilt control system appears near the cutoff frequency fc of the LPF 11c. It is therefore necessary to correct the phase by use of the offset set in the offset memory 11b.

Figure 9:
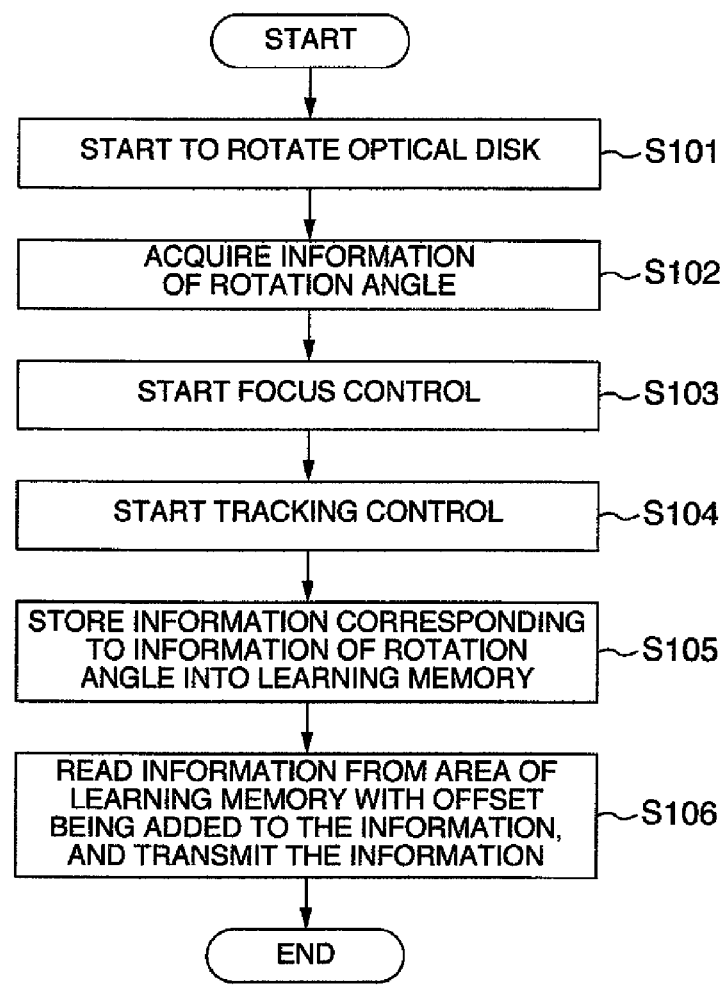
FIG. 9 is a flow chart showing processing according to the first embodiment.

Next, description will be made on the flow of control to be executed by the control portion 11 using the learning memory 11a. FIG. 9 is a flow chart showing processing to be executed by the control portion 11.

In Step S101, the control portion 11 begins to rotate the spindle motor 13 so as to rotate the optical disk 1. In Step S102, the control portion 11 acquires rotation angle information synchronous with the rotation of the optical disk 1.

In Step S103, the control portion 11 issues a command to the DSP 7 so as to transmit a focus driving signal to the focus actuator 5. Successively in Step S104, the control portion 11 issues a command to the DSP 7 so as to transmit a tracking driving signal to the tracking actuator 6. Thus, processing to track the rotation of the optical disk 1 is started.

Then, in Step S105, the control portion 11 stores data of the focus driving signal (having passed through the LPF) into the learning memory 11a during servo control while using the rotation angle information as an index of a corresponding area of the storage memory.

Then, in Step S106, the control portion 11 adds an offset set in the offset memory 11b to the index stored in Step S105, reads data of the learning memory 11a indicated by a result obtained by the addition, and transmits the read data as a tilt control value to the tilt control circuit 12. During the rotation of the optical disk 1, Steps S105 and S106 are executed repeatedly every time when the rotation angle information is updated.

As a result of the aforementioned processing, a signal inputted as a focus driving signal is stored in the learning memory 11a, and read as a tilt driving signal with the phase being controlled by the offset set in the offset memory 11b.

The optical disk apparatus 100 according to the first embodiment includes the learning memory 11a. Focus driving information corresponding to the rotation angle of the optical disk 1 is continuously stored into the learning memory 11a. Data are read from the learning memory 11a with the phase being controlled by an offset corresponding to a design value from the timing of writing on the learning memory 11a. Tilt control is carried out using the read data as a tilt driving signal. Thus, the recording/reproducing performance of the optical disk can be improved.

Second Embodiment

In the second embodiment, description will be made on an optical disk apparatus which can correct a change of a phase delay caused by a change of the rotation period and velocity of an optical disk 1, for example, due to a change of the velocity to read information from the optical disk 1 or to record information on the optical disk 1. The configuration of the optical disk apparatus according to the second embodiment is similar to that of the optical disk apparatus 100 according to the first embodiment. Parts similar to those in the first embodiment are referred to by similar numerals, and their detailed description will be omitted. Different points will be described below.

Figure 10:
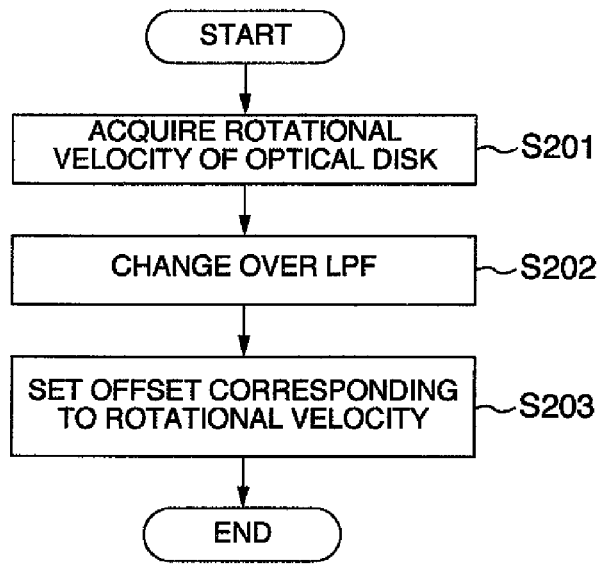
FIG. 10 is a flow chart showing processing according to a second embodiment of the present invention.

FIG. 10 is a flow chart showing processing for correcting a phase delay, which processing is executed by the control portion 11.

In Step S201, the control portion 11 acquires a rotation period of the optical disk 1. In Step 202, the control portion 11 changes over the LPF 11c in accordance with the acquired rotation period. In Step S203, the control portion 11 sets an offset corresponding to the acquired rotation period of the optical disk 1 into the offset memory 11b.

The offset corresponding to the rotation period may be set in advance in accordance with each double speed number of the rotation period of the optical disk 1, for example, when an offset set in a design value is stored in the offset memory 11b. In this case, the setting of the offset memory 11b is changed in accordance with the acquired rotational velocity. Alternatively, an offset obtained in a rotation period showing the highest rotational velocity may be stored. In this case, an offset corresponding to the acquired rotational velocity is calculated from the offset obtained at the highest rotational velocity and an offset set in the offset memory 11b (that is, an offset at a normal velocity), and set into the offset memory 11b. Alternatively, if the rotation period of the optical disk 1 has a small variation, correction can be carried out only by the offset without changing over the LPF 11c. On the contrary, the offset can be fixed while the setting of the LPF 11c is changed over in accordance with the rotational frequency of the optical disk 1 so as to fix the phase delay.

According to the second embodiment, the optical disk apparatus 100 changes over the LPF 11c in accordance with the rotation period or velocity of the optical disk 1. The phase delay varying due to the changing-over can be absorbed by changing the offset of the learning memory 11a.

The optical disk apparatus 100 is designed to change over the LPF 11c whenever the rotation period of the optical disk 1 changes. However, the LPF 11c may be replaced by a BPS (Band Pass Filter). The cutoff frequency of the BPS is changed over, and the phase angle varied due to the changing-over is set in the offset memory 11b. In this case, the configuration for generating a DC component as shown in FIG. 3 may be omitted.

Third Embodiment

According to the third embodiment, when a value of phase angle information to be written on the learning memory 11a varies significantly in comparison with a previous value or an expected value, the value of phase angle information is abandoned, and the last or previous value in a corresponding area of the learning memory 11a is held. The configuration of the optical disk apparatus according to the third embodiment is similar to that of the optical disk apparatus 100 according to the first embodiment. Parts similar to those in the first embodiment are referred to by similar numerals, and their detailed description will be omitted. Different points will be described below.

Figure 11:
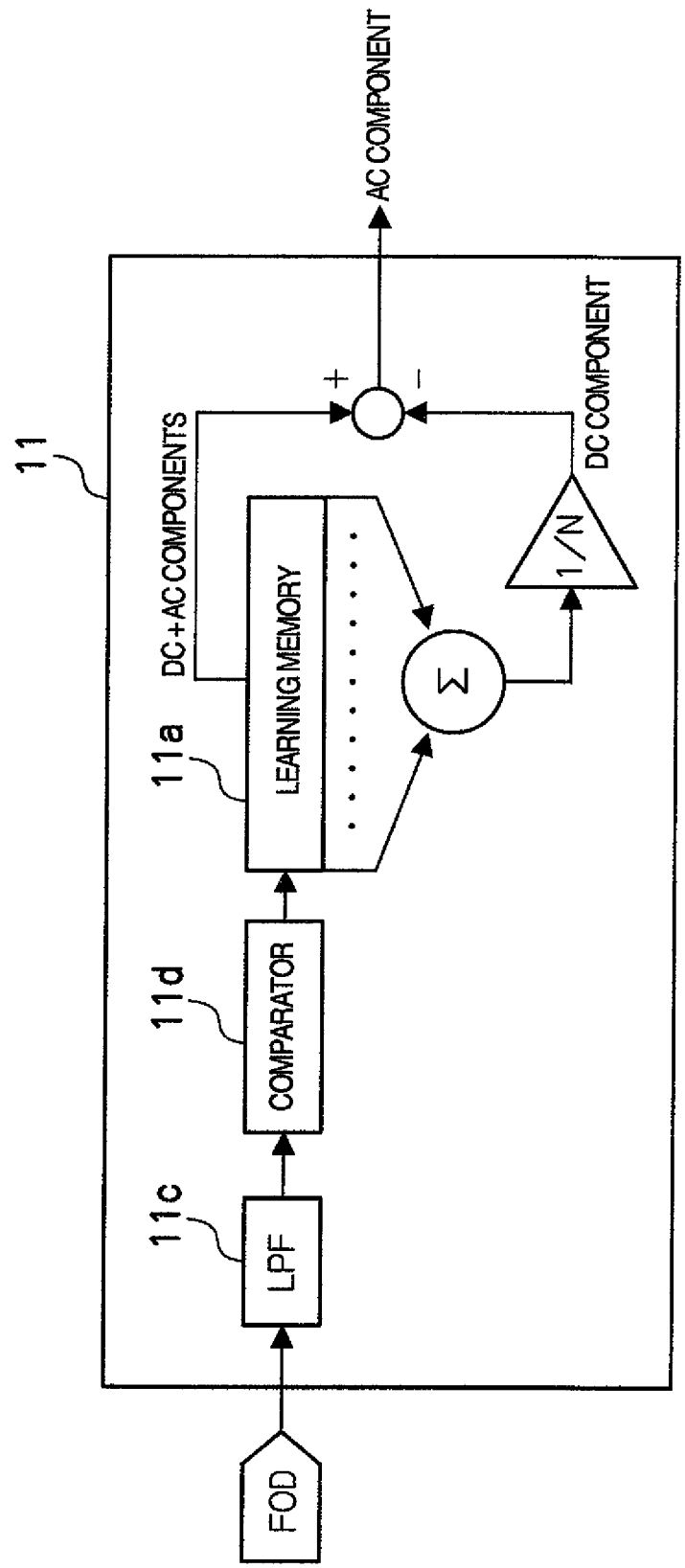
FIG. 11 is a diagram showing a configuration inside a control portion of an optical disk apparatus according to a third embodiment of the present invention.

FIG. 11 is a diagram showing the configuration of the optical disk apparatus 100 according to the third embodiment. A comparator 11d is provided between the LPF 11c and the learning memory 11a. The comparator 11d determines whether the difference between the value of data read previously and the value of data read this time is smaller than a predetermined value or not. When the difference is not smaller than the predetermined value, the value of data read this time is not written over a corresponding area of the learning memory 11a, but abandoned. When the difference is smaller than the predetermined value, the value of data read this time is written over the corresponding area of the learning memory 11a.

Thus, when the comparator 11d concludes that a value to be written on the learning memory 11a changes significantly in comparison with a previous value, the value in question is abandoned so that tilt control can be carried out without any influence of disturbance such as a defect of the optical disk 1 or the like.

Each of the aforementioned embodiments has been described on the case where the present invention is applied to the optical disk apparatus 100 having a configuration to read information from the optical disk 1. However, application of the present invention is not limited to this configuration. For example, the present invention can be also applied to an optical disk apparatus in which a configuration to record information on the optical disk 1 has been added to the optical disk apparatus 100. It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk apparatus comprising:
   a motor which rotates an optical disk;
   an optical pickup which reads at least information from the optical disk being rotated by the motor;
   a first memory which uses information of a rotation angle of the optical disk from the optical pickup as an address;
   a second memory which stores an offset by which information stored in the first memory should be shifted and then read; and
   a control portion which reads the information stored in the first memory after shifting the information by the offset stored in the second memory and which carries out tilt control using the read information.

2. An optical disk apparatus according to claim 1, wherein the first memory is a ring buffer which stores control information of the optical disk continuously in every predetermined unit in a rotation direction of the optical disk.

3. An optical disk apparatus according to claim 1, wherein the offset is set in advance in accordance with a design value.

4. An optical disk apparatus according to claim 1, wherein the offset varies in accordance with a rotational frequency of the optical disk.

5. An optical disk apparatus according to claim 2, further comprising:
   a comparison portion which compares a value of a first information piece to be stored in the first memory with a value of a second information piece stored in a corresponding one of the predetermined units before storing the first information piece in the first memory; wherein:
   when a comparison result of the comparison portion is not larger than a predetermined value, the first information piece is stored in the corresponding unit, and when the comparison result is larger than the predetermined value, the first information piece is not stored in the corresponding unit.

6. An optical disk apparatus according to claim 1, wherein the information to be stored in the first memory is a focus driving signal corresponding to the rotation angle of the optical disk.

7. A tilt control method of an optical disk apparatus including:
   a motor which rotates an optical disk;
   an optical pickup which reads at least information from the optical disk being rotated by the motor;
   a first memory which uses information of a rotation angle of the optical disk from the optical pickup as an address; and
   a second memory which stores an offset by which information stored in the first memory should be shifted and then read;
   the tilt control method comprising the steps of:
   reading the information stored in the first memory after shifting the information by the offset stored in the second memory; and
   carrying out tilt control using the read information.

* * * * *